United States Patent [19]
Blanchard et al.

[11] Patent Number: 4,788,717
[45] Date of Patent: Nov. 29, 1988

[54] TELEPHONE LINE INTERFACE OPTION MODULE

[75] Inventors: Dennis R. Blanchard, Hampstead, N.H.; Edward A. Bruckert; David G. Conroy, both of Maynard, Mass.; Richard D. Ellison, Worcester, Mass.; Anthony J. Vitale, Northboro, Mass.

[73] Assignee: Digital Equipment Corporation, Maynard, Mass.

[21] Appl. No.: 170,664

[22] Filed: Mar. 17, 1988

Related U.S. Application Data

[63] Continuation of Ser. No. 808,787, Dec. 13, 1985, abandoned.

[51] Int. Cl.$^4$ .......................................... H04M 11/00
[52] U.S. Cl. ........................................ 379/98; 379/93; 379/441
[58] Field of Search ............... 379/90, 91, 93, 94, 379/95, 96, 97, 98, 441, 442, 443

[56] References Cited

U.S. PATENT DOCUMENTS

| | | | |
|---|---|---|---|
| 4,069,392 | 1/1978 | Goldenberg et al. | 179/2 DP |
| 4,258,433 | 3/1981 | Herschtal et al. | 179/2 DP |
| 4,387,271 | 6/1983 | Artom | 179/2 DP |
| 4,471,165 | 9/1984 | DeFino et al. | 179/2 A |
| 4,503,288 | 3/1985 | Kessler | 179/2 DP |
| 4,524,244 | 6/1985 | Faggin et al. | 179/2 DP |
| 4,549,302 | 10/1985 | Heatherington | 179/2 DP |
| 4,571,456 | 2/1986 | Paulsen et al. | 179/2 C |

FOREIGN PATENT DOCUMENTS

| | | | |
|---|---|---|---|
| 0142302 | 10/1984 | European Pat. Off. | |
| 0033821 | 8/1981 | Italy | 179/2 DP |

OTHER PUBLICATIONS

"A Peripheral-Sharing Interlinked Mini-Computer System" by Kelley The Radio and Electronic Engineer, vol. 46, No. 2, pp. 76-82—Feb. 1976.

Primary Examiner—Jin F. Ng
Assistant Examiner—Wing Fu Chan
Attorney, Agent, or Firm—Michael N. Meller

[57] ABSTRACT

36 Telephone interface option module circuit for interfacing an electronic device to a telephone network. Most electronic devices, for example, modems, telephone message systems and text-to-speech systems, when coupled to a telephone network must conform to specific telephone interconnect regulations. These regulations generally vary from country to country, and therefore, the electronic device generally has to be modified to conform to a specific countries telephone regulations. The option module circuit contains the country specific telephone regulations, and when plugged into the electronic device, ensures that the electronic device conforms to those regulations.

4 Claims, 1 Drawing Sheet

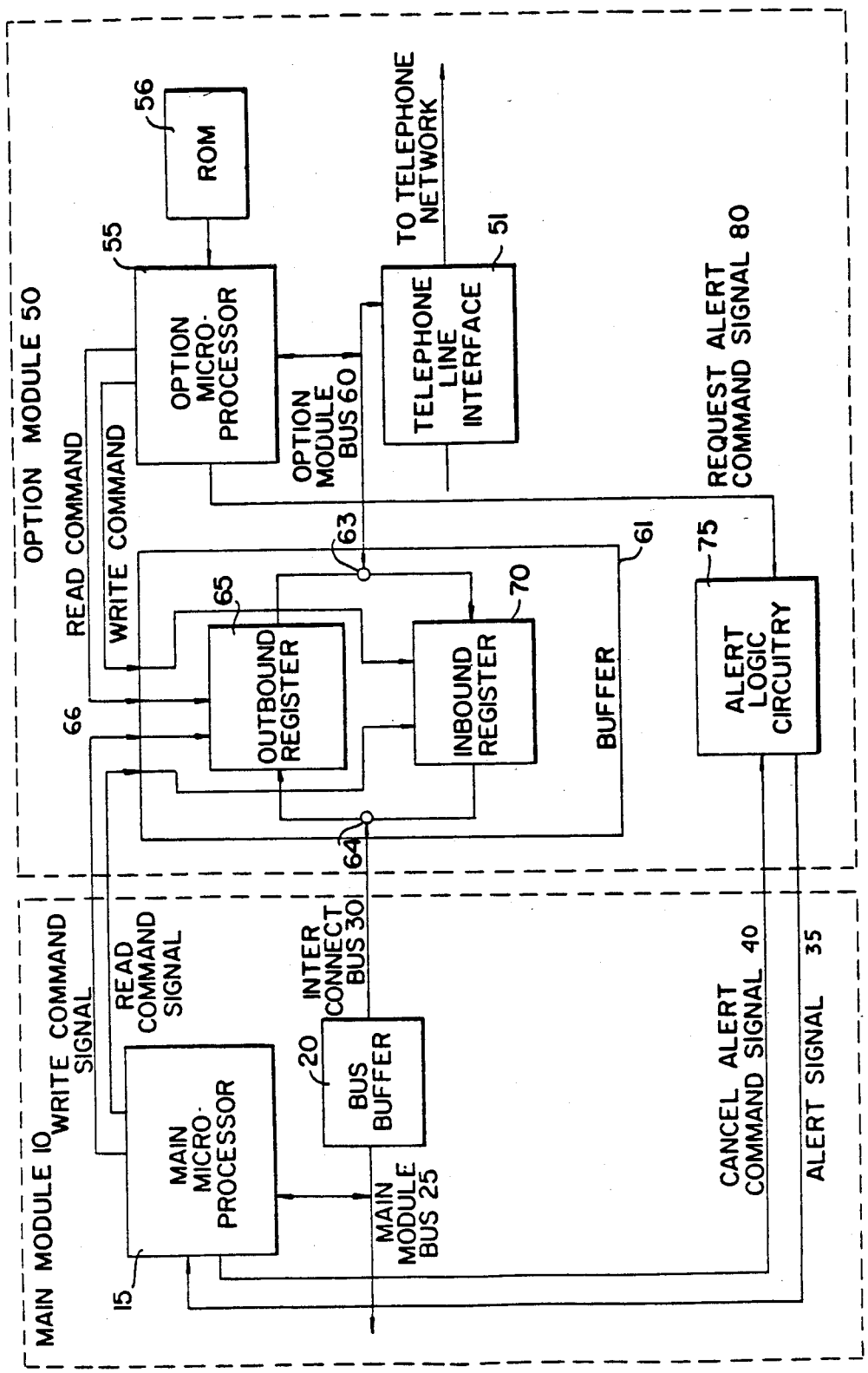

TELEPHONE LINE INTERFACE OPTION MODULE

This application is a continuation, of application Ser. No. 808,787, filed 12/13/85, now abandoned.

BACKGROUND OF THE INVENTION

The invention is a telephone line interface employed for coupling an electronic device, hereinafter main module, to a public telephone (PT) network, and is, therefore, subject to a large set of telephone interconnect regulations. Examples of such main modules include modems, telephone message systems, video-text storage systems, or, as in the preferred embodiment, a text-to-speech device. In the United States and Canada, meeting these regulations is quite straightforward (the regulations in the United States and Canada are essentially the same). However, in the rest of the world, there are many countries with different (and frequently changing) regulations. Additionally, the regulations can be plain barrier regulations.

In general, the problem of PT interconnect is solved by modifying the main module to conform to a particular country's regulations. In every prior solution, the main module is involved in some way with making the system conform to the regulatory issues. This coupling is unpleasant. A dependency between the main module and an option module is disadvantageous because it means that the option module may have to be recertified any time a change to the the main module is made. Since the base module changes with each language, many different combinations of base module and option module are possible.

SUMMARY OF THE INVENTION

The invention eliminates the dependency between the main module and the interfacing option module. In a preferred embodiment, the option module employs a small computer, wherein the option module is made responsible for all of the details of the interface to the telephone network. If an option module is present, the main module defers all judgment about telephone interfacing to the option module.

The option module is an independent piece of hardware employing a programmable CPU. The option module can even be certified on a test fixture. The main module cannot do anything to make the option module do something illegal on the telephone line. The main module can be changed at will, and the telephone certification is not compromised. In addition, the telephone interface module can be re-used. Any time a telephone product is built, the standard option module for a given country is used, and a certified product is produced.

Uncoupling the two modules provides for independent development of telephone line interfaces and main modules. Developers of main modules can work without any concern for the details of the telephone line interface option modules. Developers of telephone line interfaces can also work in isolation. If a country changes its regulations, then the developer for that country's telephone line can react to it, without any effect on any other telephone line interface option.

Brief Description of the Drawings

FIG. 1 is a block diagram illustrating the invention.

Description of the Preferred Embodiment

The invention is an apparatus (option module) for interfacing an electronic device (main module) to a telephone network. The invention contemplates that the main module, in a preferred embodiment, is a text-to-speech device. The interconnection of an electronic device with the telephone network is generally controlled by government regulations. Since there are many governments, there are many different sets of regulations. The option module is an implementation of a telephone line interface that isolates a main module, in particular, a text-to-speech device, from different and/or changing regulations.

FIG. 1 illustrates a main module 10, representing a text-to-speech device, coupled to a telephone network by a telephone line interface option module 50. The main module is shown to have a microprocessor 15, and the option module is shown to have a microprocessor 55; however, it would be possible to build both the main module 10 and option module 50 without microprocessors. The microprocessor 15, in the preferred embodiment, is an Intel 80186. Telephone line interface circuitry 51 is the physical connection between the phone system network and the option module. This circuitry ensures compliance with the electrical connection requirements of the telephone regulations.

The computer on the option module stores inputted microcode that is responsible for enforcing telephone regulations. The microcode can be changed so that the option module conforms to different or varying regulations. These regulations are usually in the form of escape sequences in which the main module is disconnected from the telephone network. The main module employs microcode, running on the microprocessor is, which determines if an option module is present. When the option module is connected, the main module relinquishes responsibility for handling these escape sequences to the option module.

There is also a channel in the reverse direction (from the option module to the main module) so that the option module can send replies to the host. The main module provides formatting services, but essentially nothing else.

The main module 10 and the option module 50 communicate with each other by sending information packets, with predefined formats, through a physical communication link. The packets are between 1 and 255 bytes in length. The physical communication link comprises a series of three bus structures, including a main module bus 25, an interconnect bus 30 and an option module bus 60. The transmission of the information packets is conducted in conformance with the stored regulations on the option module.

A bus buffer 20, located on the main module 10, couples the main module bus 25 to the interconnect bus 30. A buffer 61 comprising an outbound register 65 and an inbound register 70, both located on the option module 50, couple the option module bus 60 to the interconnect bus 30. This interface is implemented by two connectors located on the main module, wherein a pair of plugs located on the option module connect. The buffer 61 has an option port 63 coupled to the option module bus 60, a main port 64 coupled to the interconnect bus 30, and a control port 66 for coupling control signals from the microprocessor 15 and the microprocessor 55.

A protocol is used to actually transport data between the modules. This protocol initiates, as well as monitors, transfers of data. Microcode, stored in microprocessor 55, represents the telephone interconnect regulations for a particular country and ensures that the protocol is followed. The microprocessor 55, running the microcode, determines when information should be transmitted and generates control signals to implement the telephone regulations.

The outbound register 65 stores data that is flowing from the main module 10 to the option module 50. The data is written by the main module, and read by the option module. The main module initiates an outbound transfer after waiting until the outbound register 65 is empty. Waiting is necessary as the outbound register 65 may still contain the last byte of the last outbound transfer. There are some electronics, not illustrated, that generate a flag control signal. The flag signal is set TRUE when the main module writes data, and set FALSE by the option module when data is read by the option module. The flag serves to tell the option module microprocessor 55 that there is a packet size byte of data waiting in the outbound register 65 for reading.

The inbound register 70 stores data transmitted from the option module to the main module. The data is written by the option microprocessor 55 and read by the main microprocessor 15 through the bus buffer 20. There is a similar flag, a second control signal, set TRUE by an option module write and set FALSE by a main module read, which notifies the main module that there is data in the inbound register.

The option microprocessor 55, because it is dedicated to a control task, can poll the flag control signal associated with the outbound register 65, to determine if there is any data to be read. The main microprocessor 15 is not dedicated to control functions, and therefore, polling the inbound register is not feasible. The invention employs alert logic 75 for keeping both of the microprocessors 15 and 55 abreast of the status of information flow. The option microprocessor 55, having data for the main microprocessor 15, transfers the data to the inbound register 70. A request alert command signal 80 is then generated by the option microprocessor 55. This signal 80 is inputted to the alert logic 75. In response, the alert logic 75 sends an alert signal 35 to the main processor 15 to alert the main processor 15 that the data is present. The main processor is then interrupted. The main processor uses the "cancel alert command" signal 40 to make the alert signal go away (it has noticed it already), and then it reads the data from the inbound register, using the flag to decide when each byte in the packet is available.

The data packets are of variable length. The first data byte is always an opcode byte. This byte, in addition to specifying the function of the packet, implicitly determines the format of the remaining data in the packet.

The option module controls the rate at which the main module sends data to the telephone network. After an outbound packet is sent, the main module waits for a proceed packet before sending another outbound packet. This permits the option module to control the rate at which data is interfaced between the main module and the telephone network.

It is also to be understood that the following claims are intended to cover all of the generic and specific features of the invention herein described.

What is claimed as new and desired to be secured by Letters Patent of the United States is:

1. A telephone line interface option module for coupling an electronic main module to a telephone line of a telephone network, wherein data transmission onto said telephone line is subject to a set of telephone interconnect regulations, said option module comprising:
   (a) telephone line interface means having means for connection to said telephone line;
   (b) buffer means having an option port, a main port, and a control port:
   (c) a first data bus connecting said telephone line interface means to said option port of said buffer means;
   (d) a second data bus connected to said main port of said buffer means for receiving data from and sending to said main module;
   (e) means for storing said set of telephone interconnect regulations; and
   (f) processor means coupled to said storing means, to said first data bus and to said control port of said buffer means for controlling the exchange of data between said main module and said telephone line in conformance with said stored set of telephone interconnect regulations.
   wherein said option module has no means for modulating the data being exchanged between said main module and said telephone line.

2. The interface option module as defined in claim 1, further comprising alert logic means connected to said processor means and having means for connection to said main module, wherein said processor outputs a request alert control signal to said alert logic means in response to the completion of a transfer of data from said telephone line interface means into said buffer means, and said alert logic means outputs a data ready status signal on said means for connection to said main module in response to receipt of said request alert control signal.

3. The interface option module as defined in claim 2, wherein said buffer means comprises an outbound register and an inbound register, said inbound register having an output port coupled to said main port and an input port coupled to said option port, said outbound register having an input port coupled to said main port and an output port coupled to said option port, and said control port of said buffer means comprises first means for connection to said processor means and second means for connection to said main module, whereby data stored in said inbound register is transmitted to said second data bus in response to a read control signal on said second connection means of said control port, data is inputted into said inbound register from on said first data bus in response to a write control signal said first connection means of said control port, data stored in said outbound register is transmitted to said first data bus in response to a read control signal on said first connection means of said control port, and data is inputted into said outbound register from said second data bus in response to a write control signal on said second connection means of said control port.

4. A method for coupling an electronic main module to a telephone line of a telephone network, comprising the following steps:
   (a) storing a set of telephone interconnect regulations for controlling the flow of data onto said telephone line;
   (b) storing inbound data received on said telephone line in a option module buffer arranged between said main module and said telephone line;

(c) outputting a status signal to said main module indicating that said inbound stored data is available for read-out for buffer by said main module;

(d) transmitting said inbound stored data from said buffer to said main module in response to a read command signal from said main module;

(e) storing outbound data received from said main module in said buffer;

(f) polling said buffer to detect the presence of outbound stored data; and (g) transmitting said outbound stored data from said buffer to said telephone line under the control of an option module in accordance with said stored set of telephone interconnect regulations without modulation of the data being transmitted.

* * * * *